United States Patent
Poltorak

(10) Patent No.: US 7,653,551 B2
(45) Date of Patent: Jan. 26, 2010

(54) METHOD AND SYSTEM FOR SEARCHING AND SUBMITTING ONLINE VIA AN AGGREGATION PORTAL

(75) Inventor: Alexander I. Poltorak, Monsey, NY (US)

(73) Assignee: IPwealth.com, Inc., Suffern, NY (US)

( * ) Notice: Subject to any disclaimer, the term of this patent is extended or adjusted under 35 U.S.C. 154(b) by 2087 days.

(21) Appl. No.: 09/730,232

(22) Filed: Dec. 5, 2000

(65) Prior Publication Data

US 2002/0103654 A1 Aug. 1, 2002

(51) Int. Cl.
*G06Q 99/00* (2006.01)
(52) U.S. Cl. ......................................................... 705/1
(58) Field of Classification Search .................. 705/1
See application file for complete search history.

(56) References Cited

U.S. PATENT DOCUMENTS

| | | | |
|---|---|---|---|
| 4,528,643 | A | 7/1985 | Freeny, Jr. |
| 5,675,637 | A | 10/1997 | Szlam |
| 5,909,570 | A * | 6/1999 | Webber ..................... 703/13 |
| 5,991,751 | A | 11/1999 | Rivette |
| 5,991,780 | A | 11/1999 | Rivette |
| 6,009,459 | A | 12/1999 | Belfiore |
| 6,038,668 | A | 3/2000 | Chipman |
| 6,049,811 | A | 4/2000 | Petruzzi |
| 6,119,101 | A | 9/2000 | Peckover |
| 6,138,119 | A | 10/2000 | Hall |
| 6,643,641 | B1 * | 11/2003 | Snyder ........................ 707/4 |
| 6,879,990 | B1 * | 4/2005 | Boyer et al. ............... 707/205 |
| 2001/0032144 | A1 * | 10/2001 | Magid ........................ 705/26 |
| 2002/0091541 | A1 * | 7/2002 | Lundberg ..................... 705/1 |
| 2002/0095368 | A1 * | 7/2002 | Tran ........................... 705/37 |

FOREIGN PATENT DOCUMENTS

WO WO 01/35277 * 5/2001

OTHER PUBLICATIONS

Morris, Richard W., A Global Technology Manager's Policy Agenda: Intellectual Property, Advanced Technology Program, National Institute of Standards and Technology.*
Microsoft Computer Dictionary Fifth Edition published by Microsoft Press (2002).*
Larson, Jane, Phoenix-Based Portal Software Company Helps Design Corporate Products, published in the Arizona Republic on Sep. 11, 2000.*

(Continued)

*Primary Examiner*—Dennis Ruhl
(74) *Attorney, Agent, or Firm*—Anatoly S. Weiser, Esq.

(57) ABSTRACT

A method and system is disclosed for searching and submitting intellectual property listings, goods and services offered for sale online. Tailored searching is provided in a convenient and efficient manner on the Internet via an Aggregation Portal. The Aggregation Portal provides a uniform and user-friendly interface, whereby intermediary services are provided to facilitate transactions utilizing the Internet. Such services include legal, valuation, insurance, escrow, brokering, consulting and other professional services. Further, a multiple-listing type of commission sharing is created between the Aggregation Portal and various Internet auctions and exchanges. In one embodiment, a software application is downloaded on a user's personal computer (or network terminal) for searching, marketing and transacting goods and services, especially intellectual property.

2 Claims, 11 Drawing Sheets

OTHER PUBLICATIONS

IBM, Business to Business Integration Using MQSeries and MQSI with a copyright date of Dec. 2000.*

Successful portals marry structured, unstructured data; corporate portals published in the I-S Analyzer on Jul. 1, 2000.*

Reynolds, Hadley, Enterprise Knowledge, Intelligent Enterprise, published Mar. 30, 1999.*

Kujubu, Laura, Sequoiz releases XML-based portal server, InfoWorld, Sep. 20, 1999.*

Experts offer key tips on building, integrating portal marts, I-S Analyzer, Jun. 1, 2000.*

Harney, John, Portal Knowledge, IntelligentKM, Oct. 20, 2000.*

McCright, John S., EMC provides ddata snapshop; Symmetrix Connect for Enterprise Data Manager sotrage manager, PC Week, Aug. 25, 1997.*

Kimball, Ralph, Fundamental Grains; Technology Information, Intellignet Enterprise, Mar. 30, 1999.*

Fischer, Peter, Opening the Vault, Information exchange; Technology Information, Software Magazine, Apr. 1, 2000.*

AVI SAHA IBM Software Strategy Nov. 1999.

* cited by examiner

METHOD AND SYSTEM FOR SEARCHING AND SUBMITTING ONLINE VIA AN AGGREGATION PORTAL

FIELD OF THE INVENTION

This invention relates to the field of telecommunications encompassing all existing sorts of interaction multimedia technology for facilitating online transactions via an electronic communications network, such as the Internet.

DESCRIPTION OF THE RELATED ART

Whenever reference is made herein to intellectual property ("IP"), it is understood that the present invention is equally applicable to the searching, marketing of and transacting in other goods and services. Whenever the word "Internet" is used in this application, it is understood that the present invention is equally applicable to any distributed network, such as intranet, extranet, wireless networks, wide area networks (WAN), local area networks (LAN), etc.

With the heightened awareness that intellectual property is a valuable asset with a worldwide market potential, owners of these assets and parties interested in acquiring rights to these assets are increasingly turning to the Internet as the marketplace to buy, sell and license interests in these assets and for facilitating other transactions in these assets. By using the Internet in this manner, owners and users of intellectual property can deal with rights to patents, trademarks, copyrights, trade secrets, and technical know-how on a worldwide basis with a convenience and flexibility not previously possible. More broadly, the Internet may be used to facilitate the process of buying and selling small businesses, mergers, acquisitions, procurement of venture capital, etc.

An example of how the Internet is being used to facilitate intellectual property transactions on a worldwide basis is the proliferation of online patent, IP and technology exchanges and auction sites (collectively "IP Exchange") on the Internet. On these sites, which typically advertise a global portfolio of patents and trademarks issued to corporations and individuals, intellectual property is being marketed to third parties worldwide. To use a site, a visitor, on accessing the site is typically required to login and provide identifying information in the usual manner. Once logged in, the user is able to browse the available listings. To search for a specific listing, the user is requested to describe in an online questionnaire the listing of interest. This may be a simple text search, keyword search, a Boolean expression search, or a search based on a narrowly defined field of interest, patent class and subclasses or standard industrial classification code (SIC). Based on the inputted information, a query of the database containing IP listings is executed to determine a match between the user's needs and the available IP listings in the database. If several matches are found, the resulting matches may be ranked in a predetermined order and displayed on the user's computer screen or otherwise conveyed to the user. If the user is interested in any of the listings, this may eventually lead to a transaction and a transfer of IP rights. If a successful transaction between a vendor and a purchaser is executed, the online exchange or auction site receives a commission for facilitating the transaction. Similar sites for other types of intellectual property are available. Other Internet exchange and auction sites exist for listing businesses for sale, available venture capital, etc.

Examples of online IP Exchanges include:

| Company | URL |
| --- | --- |
| The Patent & License Exchange | http://www.pl-x.com/ |
| UVentures.com | http://www.uventures.com/ |
| yet2.com | http://www.yet2.com/ |
| Cool License Corporation | http://www.coollicense.com/ |
| IPnetwork.com | http://www.ipnetwork.com/ |
| Patex (CorporateIntelligence.com) | http://www.patex.com/old/ |
| Technology Exchange Company | http://www.technologyexchange.com |
| HelloBrain | http://www.HelloBrain.com |
| Patent Cafe's Patent Mart ™ | http://www.patentcafe.com/patentmart/ |
| PatentAuction.com | http://www.patentauction.com/ |
| Delphion | http://www.delphion.com |
| Vertical*I | http://www.verticali.com |

On some of the Internet IP Exchange sites, the users, in addition to the mere matching of vendors and users of intellectual property, are also provided with a range of value-added services to facilitate a transaction. These services include patent validity insurance; transaction escrow services; benchmark patent valuation and pricing; document management; and royalty stream management. By utilizing these additional services, the user is provided with guidance and experienced management to close a deal with fewer hassles and in a shorter time frame. With these additional services, sophisticated intellectual property deals can be executed including joint development agreements, licensing and cross-licensing agreements, and assignments of patent rights, general contracts and contract services.

Notwithstanding their present value in facilitating intellectual property transactions, several problems have surfaced, or are anticipated with the present Internet IP Exchanges. For instance, as the number of Internet IP Exchanges proliferates and with each site presenting a different user interface, it is becoming bewildering for a user to obtain tailored information or to list their own property. Another problem is that it is becoming time-consuming for the user to access each site, register on the IP Exchange, login, input the requested information, analyze the output, compare the information from several sites, decide on a technology and then deal with the several sites to negotiate the best deal. Another problem is that users are often confused deciding what is the most appropriate auction or exchange to list their property or services with. Different exchanges charge different fees and commissions and offer different market exposure to their users. Yet another problem is that the value-added services offered at some of these sites are not uniform but vary from site to site. Many IP Exchanges do not offer any such value-added services at all. The variation in interface of value-added services provided or unavailability thereof inevitably make the search burdensome and introduce a degree of uncertainty in the whole transaction with the result that the sites are not living up to their full potential. In fact, as it was reported at the Licensing Executive Society (LES) meeting in New York, in May of 2000, as of that date, the sum total of only one patent licensing transaction has been consummated on all of the Internet IP Exchanges. Similarly, many of the problems described hereinabove are present in other Internet auction and exchanges dealing with, for example, sale of business or venture capital.

Accordingly, in view of these and other problems, it is an objective of the present invention to provide for an alternative approach to streamline the marketing and exchange of goods and services, especially intellectual property, on the Internet. Similarly, it is an objective of the present invention to provide for tailored searching, especially intellectual property searching, in a convenient and efficient manner on the Internet. Further, it is an objective of the invention to provide for a uniform and user-friendly interface on the Internet. Still further, it is an objective of the invention to provide a one-stop shopping solution for goods and services, especially intellectual property, on the Internet. Further yet, it is an objective of the invention to provide for an Intellectual Property Aggregation Portal on the Internet. Additionally, it is an objective of this invention to provide for central location from which users may compare and evaluate various auctions and exchanges and submit their listings to an auction or exchange or chosen plurality thereof. Yet another objective of the invention is to provide a software application which may be run from the user's local computer to effectuate the tailored searching and listing submission, especially of intellectual property, in a convenient and efficient manner on the Internet, providing a uniform and user-friendly interface. Additionally, it is an objective of the invention to provide for value-added services to facilitate transactions of intellectual property on the Internet. Still further it is an objective of the invention to improve the user's chances of finding a broad selection of the desired goods and services, especially intellectual property, using the Internet, while providing a broadened exposure for suppliers of such goods and services. Furthermore, it is an objective of the invention to provide analytical tools, intermediary services including legal, valuation, insurance, escrow, brokering, consulting and other professional services to facilitate transactions, especially intellectual property transactions, utilizing the Internet. It is yet another objective of the present invention to create commission sharing, for example a multiple-listing type of commission sharing, between the Aggregation Portal and various Internet auctions and exchanges.

Existing aggregation sites, such as Yahoo! Auctions (http://auctions.yahoo.com/), Bidder's Edge (http://www.biddersedge.com/), MySimon (http://www.mysimon.com), and the like are inadequate for the purposes described hereinabove. These aggregation sites ultimately have to bring a user to the listing auction site to bid on an item of interest. After clicking (or double-clicking) on an item of interest, which is served by a hyperlink, the user is transferred to the listing exchange or an auction such Ebay, Amazon, or one of the Yahoo auctions or stores. Once there, the user then bids on the item of interest. Similarly, a software application, such as AuctionFerret from ZDNet, allows users to download this software application program to their own computer and to search preselected auctions from the user's local computer. Listings displayed as a result of the search serve as hyperlinks which will transfer the user to the listing site, once they are clicked (or double-clicked) upon. These work relatively well with consumer items such as books, movies, antiques, electronics, and similar items typically sold through Ebay, Yahoo, Amazon, etc. that do not require a user to logon before searching the items listed. These aggregation sites, however, do not function with exchanges listing intellectual property, businesses for sale, venture capital and similar goods and services, that typically require a user to logon to the site before the user can search or bid on the items listed thereon. In addition, the prior art aggregation sites do not allow the user to submit a listing to be posted across all of the aggregated sites. If the user desires to have a particular item listed on multiple sites to gain greater exposure for the item, the user must go through a time consuming process of listing the item directly on each of the auction sites. Furthermore, the user must separately manage the simultaneous auctions of the same item that may require the user to satisfy multiple winning bids for the same item. While this may be possible for goods and services that the user has available in quantity, satisfying multiple winning bids for the same item is impossible when the subject item is unique, as in the case of intellectual property. Finally, these prior art aggregation portals typically do not offer any value-added services, besides comparing prices.

SUMMARY OF THE INVENTION

In accordance with the principles of the present invention, the above and other objectives are realized in a method, system and database for facilitating a one-stop shopping aggregation portal site on the Internet and a software application for searching, listing, marketing and transacting goods and services, especially intellectual property. With such method, system and database, information available on all online exchange and auction sites on the Internet, as well information from other sources, is consolidated in a single, one-stop aggregation portal site using a uniform user-friendly interface. At this aggregation portal site, both vendors and users can interact, with the assistance of knowledgeable intermediaries, to effect optimum transactions. In the process, the site also benefits from a commission for a successful transaction, the commission being shared with the listing exchange or auction site in multiple listing format or other agreed upon format. The aggregation portal site includes an Internet portal (i.e., an intellectual property portal) through which the user is invited to enter and explore databases containing listings of available or wanted property (such as intellectual property) on the Internet or to submit their listings to an exchange or plurality of exchanges of their choice. Several means are provided to explore the portal including clicking on an icon, entering one or more keyboard keystroke(s), or inputting one or more voice command(s), and other means well known in the art. These and other aspects of the invention are explained in greater detail in the various embodiments below.

In a first embodiment, an IP Aggregation Portal, on an ongoing basis transparent to the user, accumulates information on available intellectual property, including the information available at other IP Exchange sites, by periodic polling and searching such other sites, to be made available to users.

In a second embodiment, the IP Aggregation Portal executes queries and searches the sites of other IP Exchanges in real time upon a user's search request.

Furthermore, in either of the above-mentioned embodiments of the IP Aggregation Portal, the information is categorized and prioritized for ease-of-use, uniformity and user-friendly access based on a given set of user input parameters. Additionally, the IP Aggregation Portal provides the user with the option of engaging the services of experienced and knowledgeable consultants via a transaction manager, for a specific purpose such as valuation of the intellectual property, in order to facilitate a transaction. The IP Aggregation Portal includes means to negotiate the acquisition of intellectual property information from other Internet IP Exchange sites; means for allowing the users to input their desired intellectual property specification; means for matching users' needs with the available intellectual property; and means for the IP Aggregation Portal to interact with users to manage a transaction; means to evaluate and compare various auctions and exchanges; and means to submit user's listing to one or more chosen auctions and/or exchanges. Thus to the users, the present invention is a streamlined and time-efficient procedure for facilitating locating property (especially intellectual property) listings or want-ads; for evaluating the feasibility of selling or acquiring interests in the property (especially intellectual property); and for pursuing a transaction (especially, in intellectual property).

In a third embodiment, a system and method are provided wherein a software application is downloaded to the user's terminal (e.g. personal computer, network terminal, personal digital assistant (PDA), Internet appliance, web-enabled cellular phone and the like) and the software application is used to search from the user's terminal a variety of Internet auction and exchanges (particularly intellectual property listings) for facilitating one-stop shopping by searching, marketing, submitting listings and transacting goods and services, especially intellectual property. Information available on all online exchange and auction sites, as well information from other sources, is searchable with a single query using a uniform user-friendly interface. The software application executes a query as specified by the user, searches predetermined Internet auction sites and exchanges, and displays search results in a uniform user-friendly format. Upon selection of a listing of interest, the user indicates his or her interest by clicking on the listing of interest (or by other similar means), thereby notifying the provider of said software application of his or her interest in a particular technology. Thereafter, a transaction manager is assigned which contacts the user and the listing exchanges and facilitates the desired transaction. Similarly, the user may submit a listing to one or more selected auctions and/or exchanges from said software application. The user may be required to preregister on the desired auctions and exchanges and to store respective user names and passwords using the application software, which will then login the user every time a query is executed. Alternatively, the user may be asked to provide certain personal information, such as the user's first and last name, the name of the company, address, phone number and e-mail address, which is used by the application software to automatically register the user with a plurality of Internet auctions and exchanges.

DETAILED DESCRIPTION OF THE PREFERRED EMBODIMENTS

The present invention is a method, system and database for facilitating a one-stop shopping aggregation portal site on the Internet and a software application for searching, marketing and transacting goods and services, especially intellectual property. With such method, system and database, information available on all online exchange and auction sites on the Internet, as well information from other sources, is consolidated in a single one-stop shopping aggregation portal site using a uniform user-friendly interface. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention. The invention is now described in greater detail in conjunction with the accompanying drawings.

Figure 1:
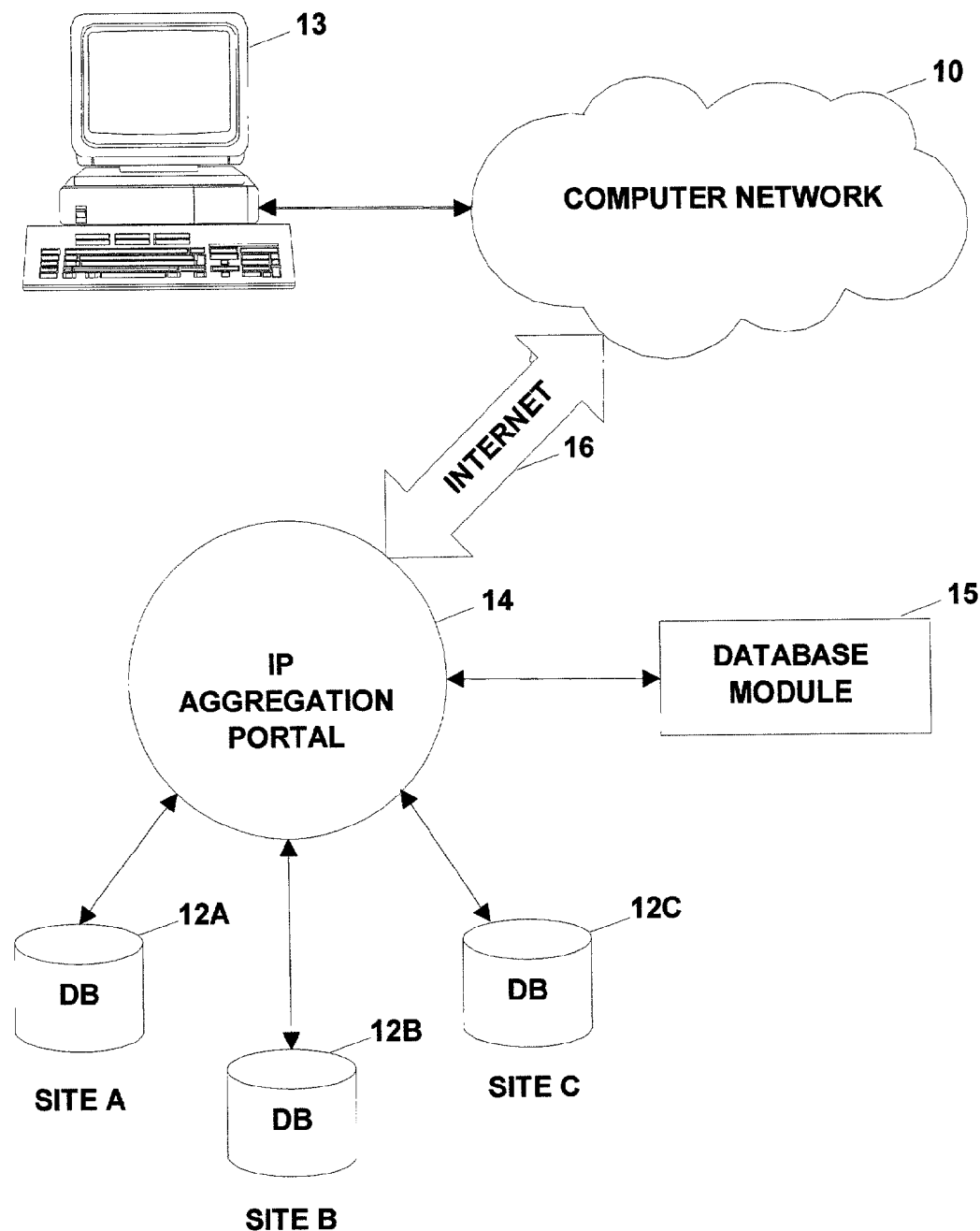
FIG. 1 is a schematic diagram of the aggregation portal system, wherein an IP Aggregation Portal is connected to an external database module, in accord with one embodiment of the present invention.

Referring now to FIG. 1, a system in accordance with the present invention is illustrated. The system components of the invention comprise generally a computer network 10 that includes several modules of hardware and software components. The hardware components include equipment (not specifically shown) that is well known in the art for configuring and connecting a computer network. Suitable computer networks include Internet, intranet, extranet, wide-area computer networks (WAN), local area computer networks (LAN) and wireless networks, and associated network and telecommunication hardware and software for connecting and configuring a computer network in a manner also well known in the art. For the present purposes an "intranet" computer network is a network of computers linking users within an entity such as a business corporation and restricted to outside users. An "extranet" is a private secure wide area network of computers linking users of different entities, typically allowing company's customers to logon into a company's intranet. A "wireless" network simply refers to how information in a network is transmitted. The computer network 10 connects one or more users 13 to IP Aggregation Portal 14 via the Internet 16.

Suitable hardware components include computers, PDAs (Personal Digital Assistants), computer terminals, Internet appliances, printers, servers, routers, telecommunication lines, telecommunication connections, modems and other equipment, well known in the art and suitably configured for Internet access.

Similarly, suitable software components include TCP/IP protocol, World Wide Web (WWW), Internet browsers, such as MS Internet Explorer, Netscape Navigator, Mosaic, etc., databases, search engines, and other software well known in the art having the function of connecting, configuring and using a computer network, e.g. the Internet. Additionally, the invention provides for a software programming component for configuring an aggregation portal Internet site and for establishing an intellectual property portal on the website. The software programming component includes programming language, as for example Visual Basic, C++ or Java, ordinarily employed for Internet programming; hypertext marking language, e.g. HTML or XML, ordinarily employed for describing a web site. Further provided in accordance with the invention is a programmable database for data acquisition, data storage, data query, data analysis and information presentation, such as Oracle, NT SQL Server, MS Access, ASP, ColdFusion, etc. The hardware and software modules of the invention are configured in the usual manner for Internet access in a manner well within the ordinary skill in the art.

The IP Aggregation Portal 14 is established on the Internet 16. This is done in the usual way and involves creating an Internet address, registering a domain name, hosting the domain on an internal server or external third-party server, creating a home page and a link to a plurality of web pages defining a website designated as an intellectual property aggregation portal. A link to the IP Aggregation Portal 14 from the home page is established in the usual manner, e.g. utilizing a point and click icon, hyperlink or providing a selection menu for entering line commands.

A software programming language environment is provided by linking an external programmable database module 15 to the IP Aggregation Portal 14. An administrator is thus able to maintain the Internet site, accept users' queries, store the queries in a database, compare a query with information in the database and present the results of the query to the user. Several patent auction and exchange site databases 12A, 12B, and 12C are accessible via the IP Aggregation Portal 14 to provide one-stop shopping. To facilitate access to patent auction site databases 12A, 12B, and 12C from the IP Aggregation Portal 14, it is contemplated that the IP Aggregation Portal 14 would have an agreement with each IP Exchange site including rules for: registration and login; sharing information; formatting information; storing and retrieving information; sharing of commissions; managing a transaction between a user and the owner of the intellectual property; and other business related agreements.

Figure 2A:
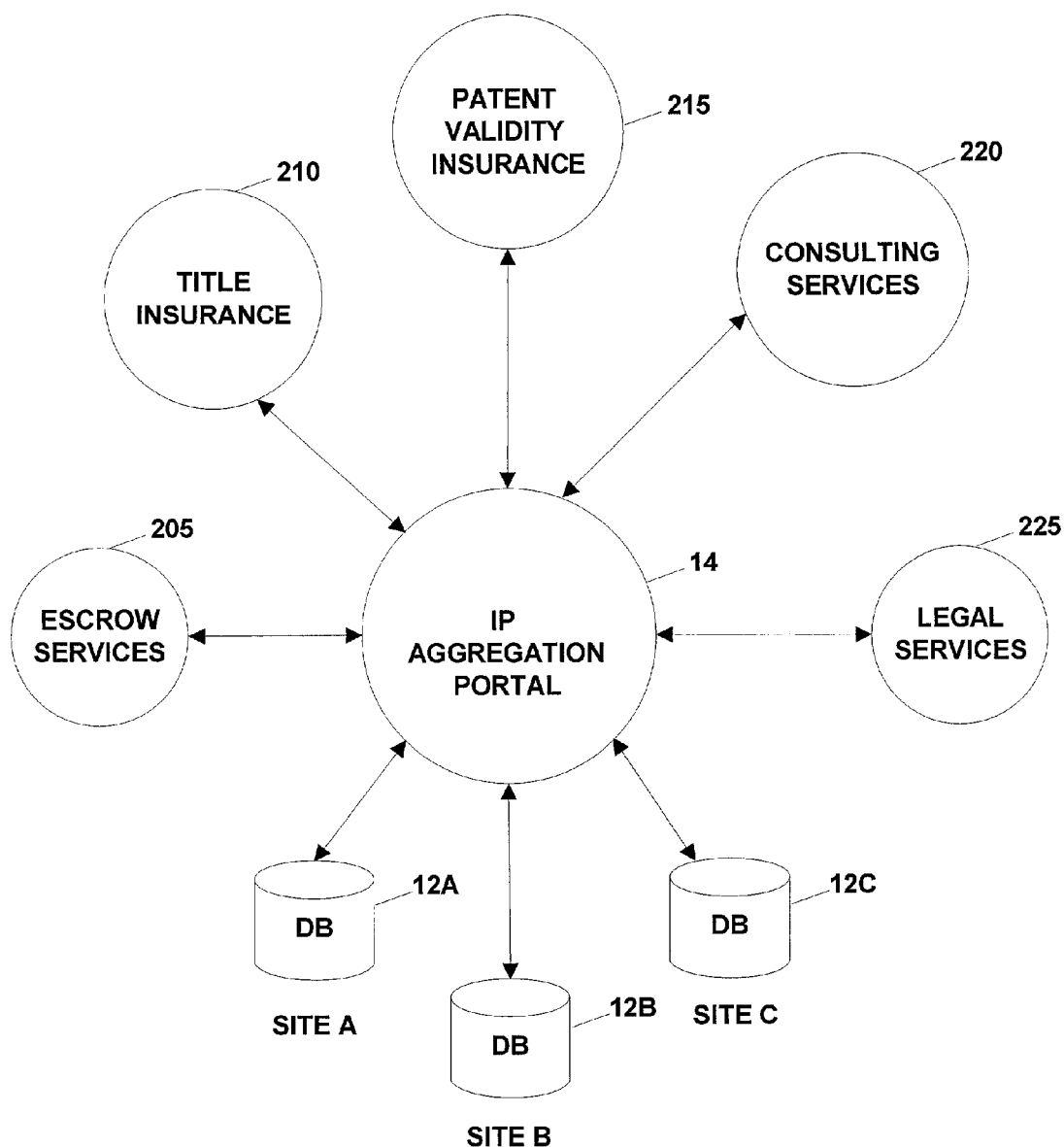
FIG. 2A is a schematic diagram of the IP Aggregation Portal of FIG. 1 connected to a plurality of specialized transaction service nodes, in accord with the present invention.

Referring to FIG. 2A, IP Aggregation Portal 14 facilitates and manages intellectual property transactions by providing analytical tools and legal, professional and management assistance to users and owners of the intellectual property in negotiating an agreement; closing a deal; and administering a contract. IP Aggregation Portal 14 is shown connected to escrow services 205, title insurance services 210, patent validity insurance services 215, consulting services 220, legal services 225 and analytical tools 230.

Figure 2B:
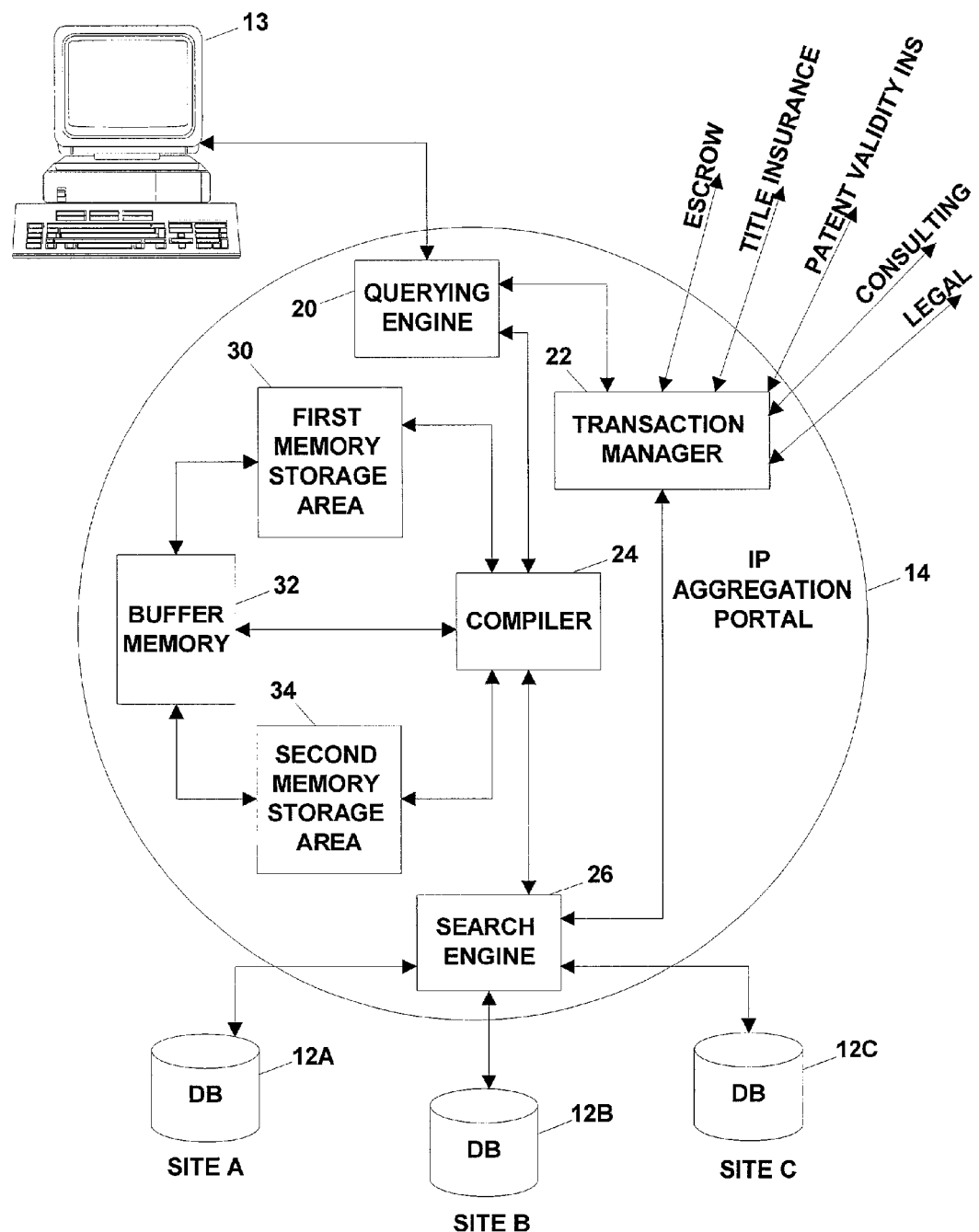
FIG. 2B is a schematic diagram illustrating the internal components of the IP Aggregation Portal of FIG. 1.

Referring to FIG. 2B, Aggregation Portal 14 is illustrated comprising a querying engine 20, transaction manager 22, compiler 24, search engine 26, first memory storage area 30, buffer memory 32 and second memory storage area 34. Use of the above mentioned components shall now be described in combination with the presently preferred method and embodiments of the present invention. The IP Aggregation Portal 14 provides the user with the option of engaging the services of experienced and knowledgeable consultants via a transaction manager 22, for a specific purpose such as valuation of the intellectual property, in order to facilitate a transaction. The IP Aggregation Portal 14 includes means 22 to negotiate the acquisition of intellectual property information from other Internet IP Exchange sites 12A, 12B, and 12C; means 13 for allowing the users to input their desired intellectual property specification; means 24 for matching users' needs with the available intellectual property; and means 20 for the IP Aggregation Portal 14 to interact with users to manage a transaction; means 24 and 26 to evaluate and compare various auctions and exchanges; and means 20, 24, 26 to submit the user's listing to one or more of chosen auctions and/or exchanges 12A, 12B, and 12C. A software application is downloaded to the user's terminal 13 and the software application is used to search from the user's terminal 13 for a variety of Internet auction and exchanges 12A, 12B, and 12C. The software application executes a query as specified by the user, searches predetermined Internet auction sites and exchanges 12A, 12B, and 12C, and displays search results in a uniform user-friendly format. Upon selection of a listing of interest, the user indicates his or her interest by clicking on the listing of interest (or by other similar means), thereby notifying the provider of said software application of his or her interest in a particular technology. Thereafter, a transaction manager 22 is assigned to the transaction. The transaction manager 22 contacts the user and the listing exchanges 12A, 12B, and 12C and facilitates the desired transaction. Similarly, the user may submit a listing to one or more selected auctions and/or exchanges from said software application. The user may be required to preregister on the desired auctions and exchanges 12A, 12B, and 12C and to store respective user names and passwords using the application software, which will then login the user every time a query is executed. Alternatively, the user may be asked to provide certain personal information, such as the user's first and last name, the name of the company, address, phone number and e-mail address, which is used by the application software to automatically register the user with a plurality of Internet auctions and exchanges 12A, 12B, and 12C. In either case, when the user logs into Aggregation Portal 14, Aggregation Portal 14 automatically establishes a connection with sites 12A, 12B and 12C by logging into sites 12A, 12B and 12C using the password information of the particular user. Thus, Aggregation Portal 14 enables the user to interact with a plurality of auction sites and exchanges through a single interface and sign-in process.

Figure 3A:
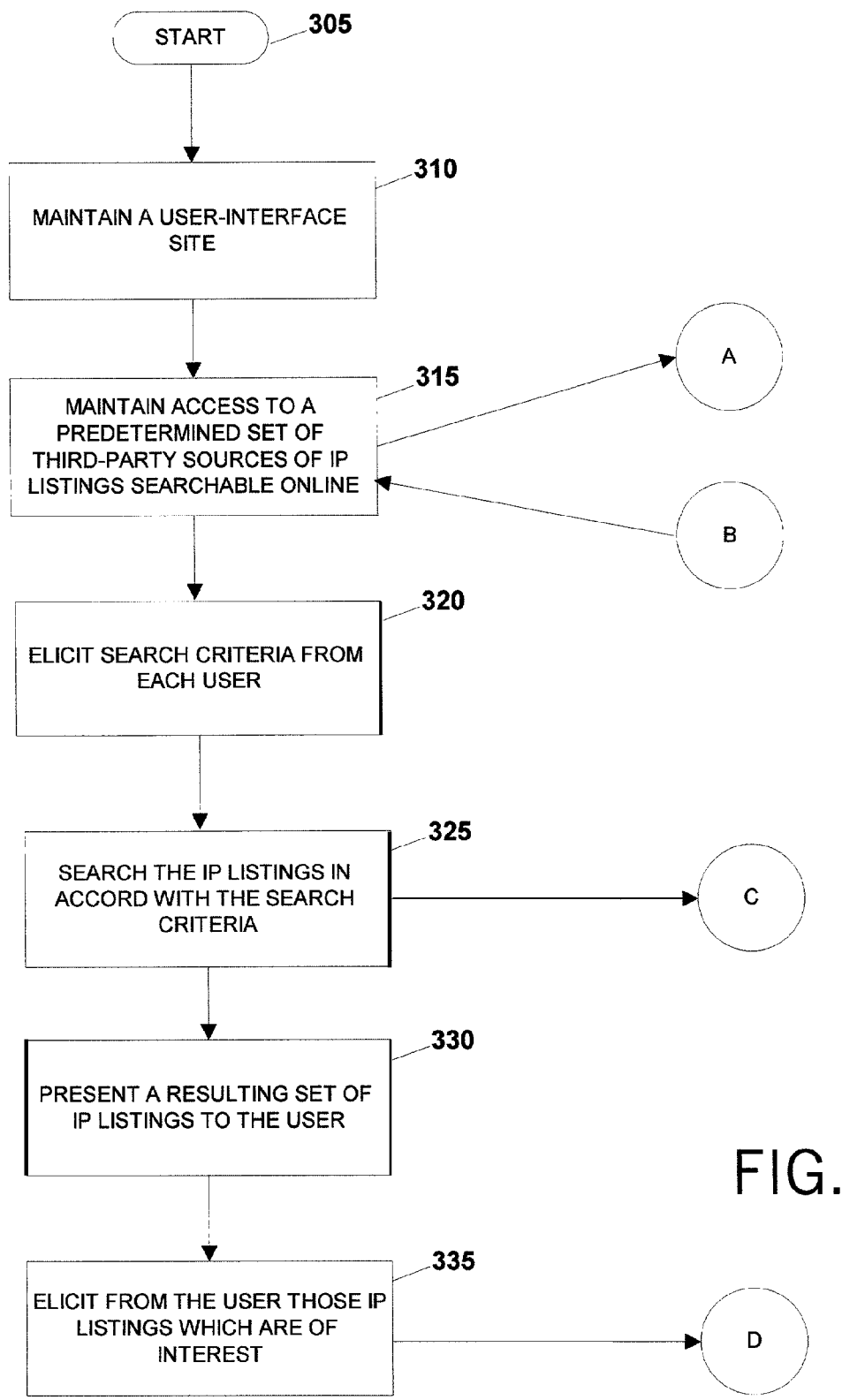
FIGS. 3A, 3B, 3C, 3D and 3E are flow charts describing a first method of searching intellectual property listings online, in accord with the present invention.
Figure 3B:
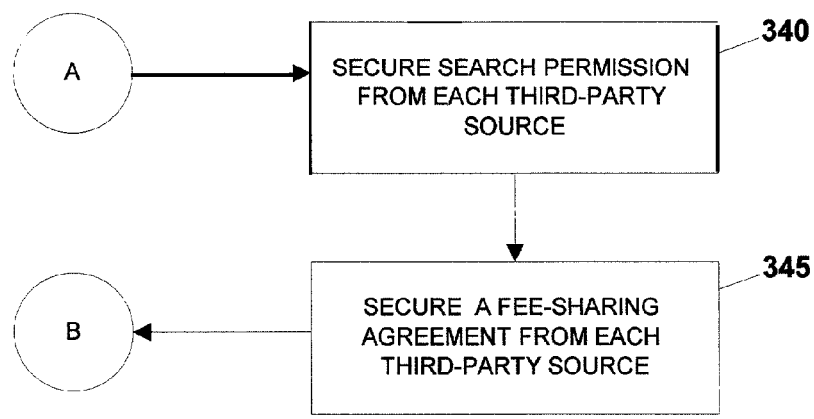

Referring to FIGS. 3A and 3B, a method of searching and submitting intellectual property listings online is initiated at step 305. A user-interface site (IP Aggregation Portal 14) is maintained and made accessible to a plurality of users (step 310). Access to a predetermined set of third-party sources of intellectual property listings 12A, 12B, and 12C searchable online is maintained (step 315). As part of maintaining access to the predetermined set of third-party sources 12A, 12B, and 12C, permission from each third-party source is secured, thus allowing search of the third-party sources 12A, 12B, and 12C and presenting listings therefrom to the users (step 340). Further, a fee-sharing agreement in respect of any fees paid as a result of transactions arising out of contacts initially made through the IP Aggregation Portal 14 is secured from each of the third-party sources 12A, 12B, and 12C (step 345). Search criteria are then elicited from each user for searching each of the third-party sources 12A, 12B, and 12C (step 320). A search of each of the third-party sources 12A, 12B, and 12C is then performed in accord with the search criteria elicited from the user (step 325). A resulting set of intellectual property listings is presented to the user in response to performing the search (step 330). The identification of those listings of the set of intellectual property listings which are of interest to the user are then elicited from the user (step 335).

Figure 3C:
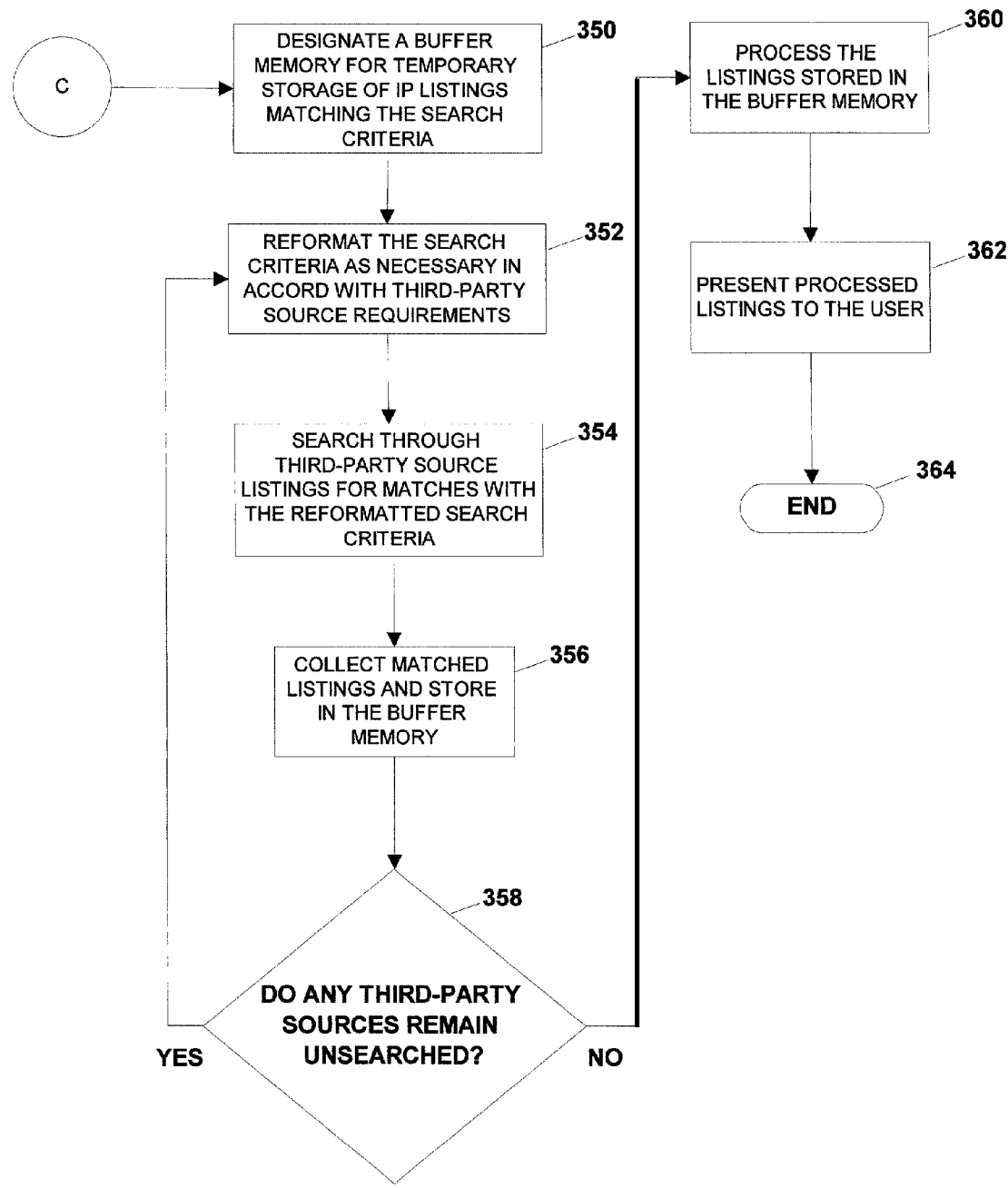
Figure 3D:
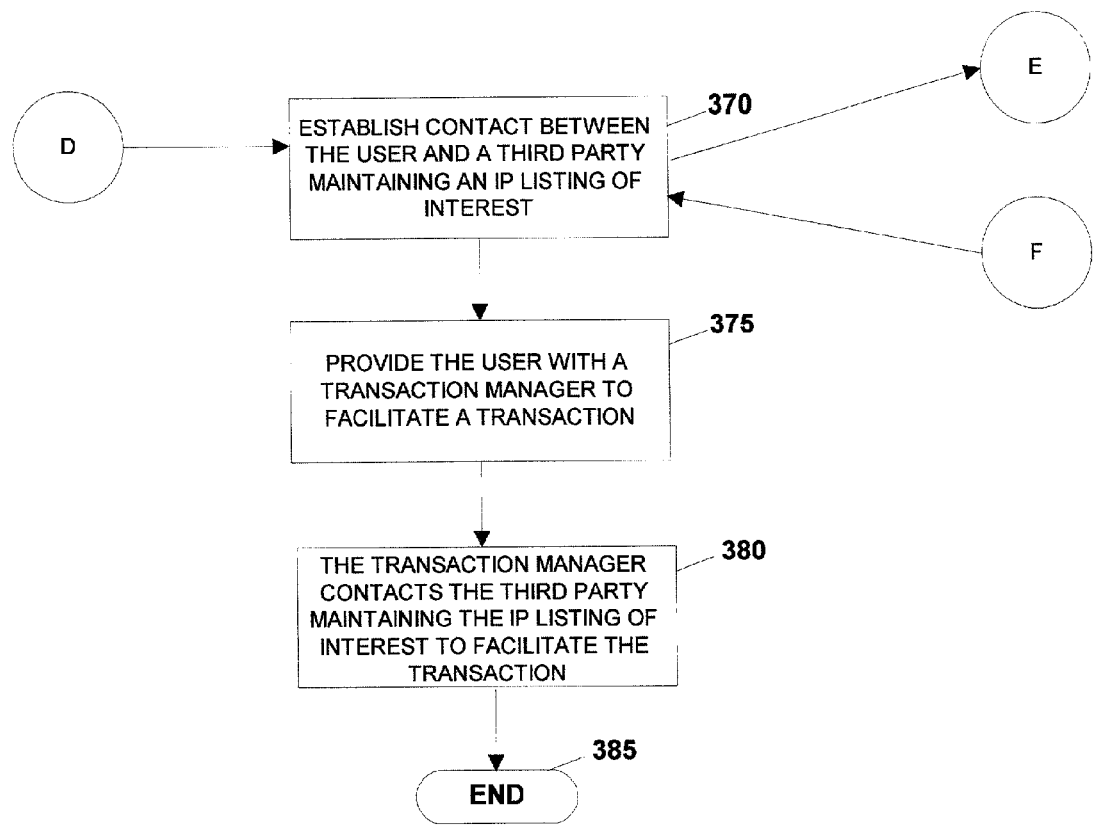
Figure 3E:
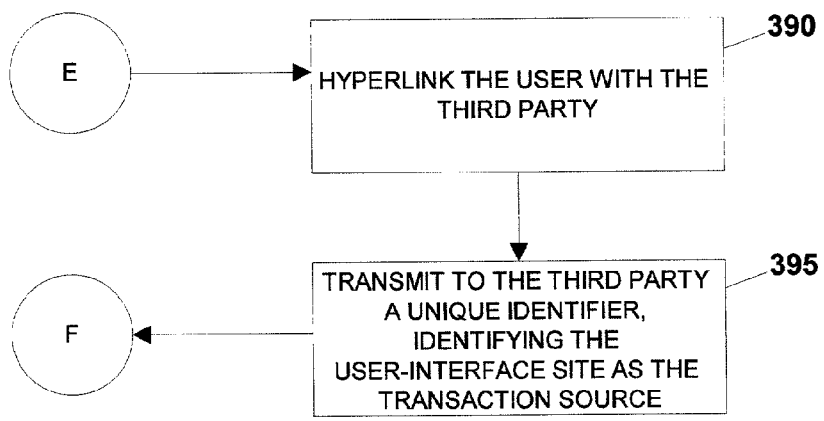

Referring to FIGS. 3D and 3E, a method of carrying out a transaction based on the intellectual property listings of interest will now be described. In step 370, contact is established between the user and a third party maintaining intellectual property listings of interest to the user. Such contact is implemented by hyperlinking the user with the third party (step 390), and transmitting to the third party a unique identifier, identifying the IP Aggregation Portal 14 as the source of a contemplated intellectual property transaction (step 395). User is then connected to one or more of escrow services 205, title insurance services 210, patent validity insurance services 215, consulting services 220, and legal services 225, via transaction manager 22 residing within the IP Aggregation Portal 14, to facilitate the transaction (step 375). Transaction manager 22 establishes contact between the third party and the one or more services 205, 210, 215, 220 and 225 on behalf of the user (step 380). The method terminates at step 385.

Referring to FIGS. 2B and 3C, both a method and system for performing a search of each of the third-party sources 12A, 12B, and 12C in accord with search criteria elicited from the user will now be described. In step 350, a buffer memory 32 is designated for temporary storage of intellectual property listings matching the search criteria elicited from the user (step 350). Using compiler 24, search criteria received from user via querying engine 20 is reformatted as necessary in accord with individual requirements of a specific third-party source of intellectual property listings (step 352). The listings of the specific third-party source are searched for matches with the reformatted search criteria (step 354). The reformatted search criteria is transmitted from compiler 24 to search engine 26, which performs the actual search. Intellectual property listings that match the reformatted search criteria are collected and stored in buffer memory 32 (step 356). A determination is then made as to whether any of the third-party sources 12A, 12B, and 12C remain unsearched (step 358). The performance of steps 352, 354, 356 and 358 are repeated until all of the third-party sources 12A, 12B, and 12C have been searched. The intellectual property listings stored in buffer memory 32 are then processed by compiler 24. Once it is determined in step 358 that the search is complete, compiler 24 reformats the intellectual property listings stored in buffer memory 32 in a predetermined format (step 360) prior to presenting the listings to user (step 362). The intellectual property listings stored in buffer memory 32 may be reordered by compiler 24 according to a predefined criteria. The method terminates at step 364.

Figure 4A:
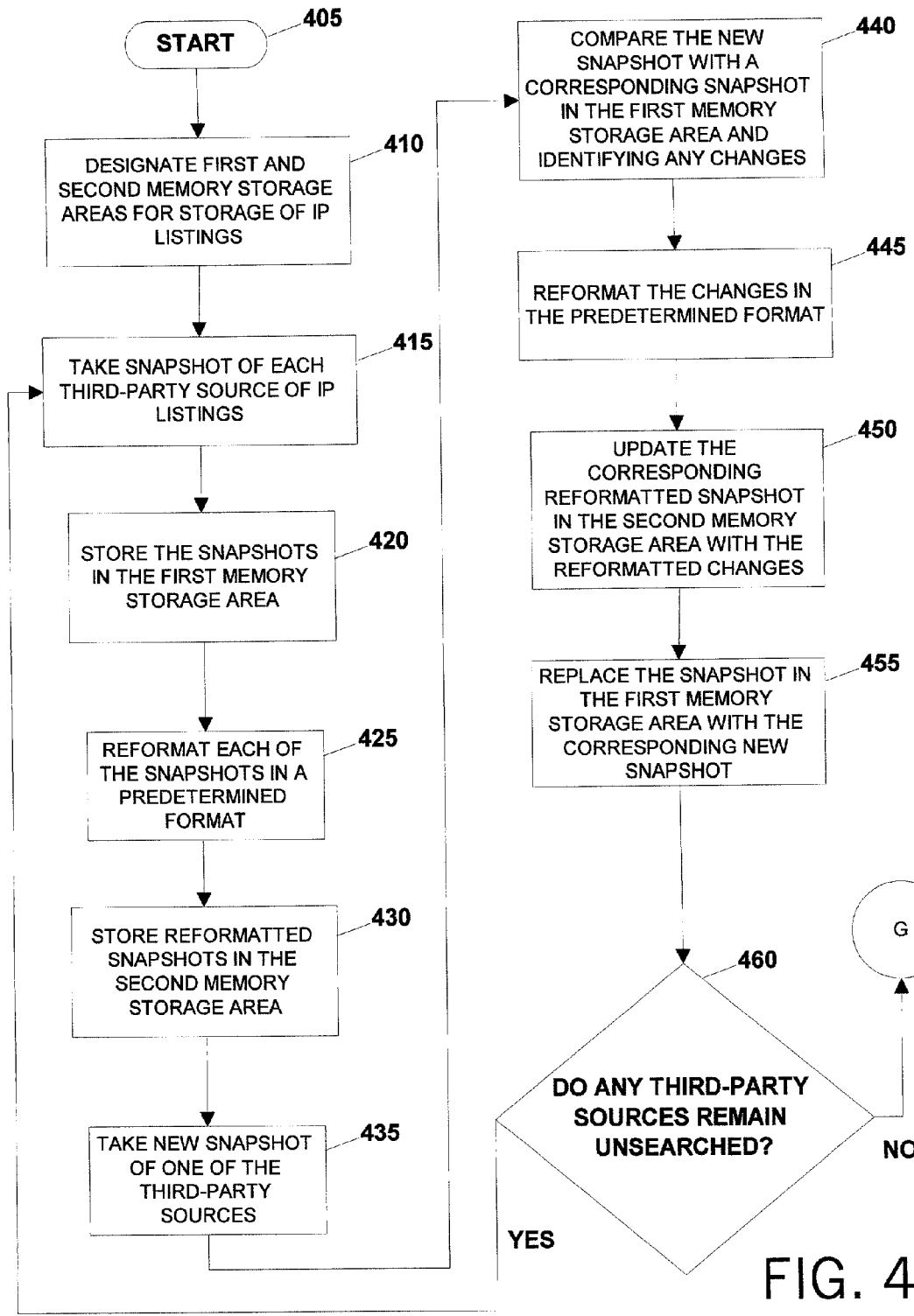
FIGS. 4A and 4B are flow charts describing a second method of searching third-party sources, in accord with the present invention.
Figure 4B:
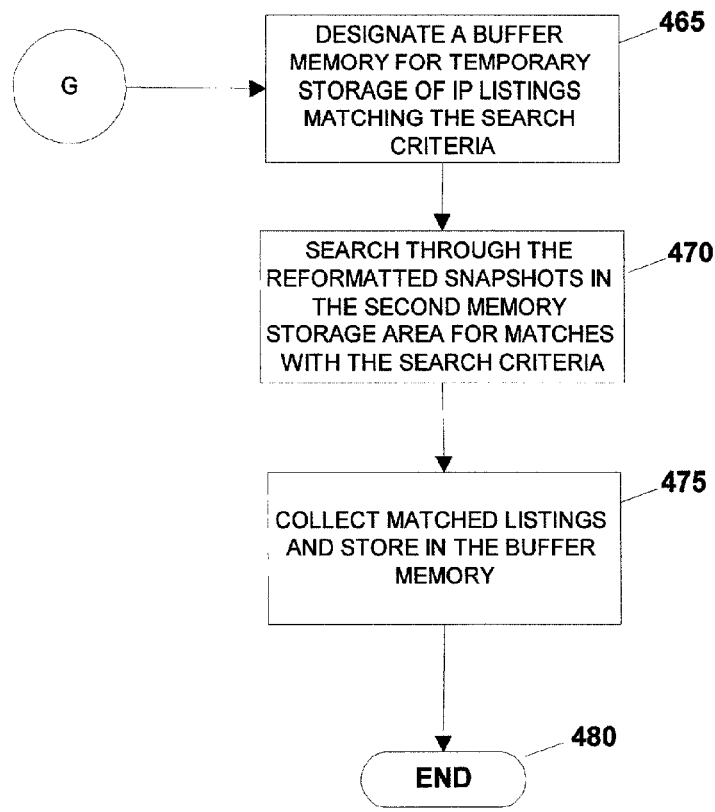

Referring to FIGS. 2B, 4A and 4B, an alternate method and system for performing a search of each of the third-party sources 12A, 12B, and 12C in accord with search criteria elicited from the user will now be described. The search process is initiated at step 405. First memory storage area 30 and second memory storage area 34 are designated for storage of intellectual property listings (step 410). Via search engine 26, a snapshot of each of the third-party sources 12A, 12B, and 12C is taken (step 415) and stored in first memory storage area 30 via compiler 24 (step 420). Each of the snapshots is reformatted in a predetermined format by compiler 24 (step 425). The reformatted snapshots are then stored in second memory storage area 34 (step 430). Via search engine 26, a new snapshot of one of the third-party sources 12A, 12B, and 12C is taken and forwarded to compiler 24 (step 435). Compiler 24 compares the new snapshot with the snapshot of the same third-party source in the first memory storage area 30 and identifies any changes (step 440). Compiler 24 reformats the identified changes in the same predetermined format mentioned previously (step 445). A corresponding reformatted snapshot in the second memory storage area 34 is updated with the new snapshot (step 450). The corresponding snapshot stored in the first memory storage area 30 is replaced with the new snapshot (step 455). A determination is then made as to whether any of the third-party sources 12A, 12B, and 12C remain unsearched (step 460). The performance of steps 415, 420, 425, 430, 435, 440, 445, 450, 455 and 460 are repeated until all of the third-party sources 12A, 12B, and 12C have been searched. Once it is determined in step 460 that the search is complete, a buffer memory 32 is designated for temporary storage of intellectual property listings matching the search criteria elicited from the user (step 465). Compiler 24 searches through the reformatted snapshots in the second memory storage area 34 for matches with the search criteria (step 470). Intellectual property listings that match the search criteria are collected and stored in buffer memory 32 (step 475). The method terminates at step 480.

Figure 5:
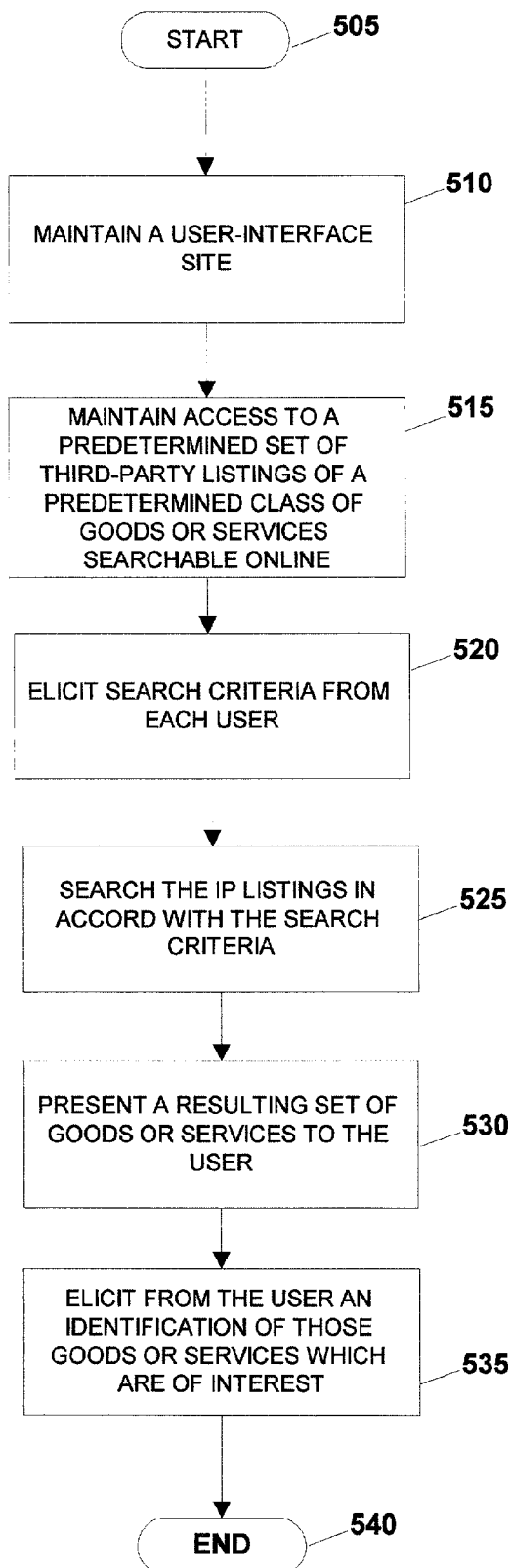
FIG. 5 is a flow chart describing a third method of searching listings of a predetermined class of goods or services offered for sale online, in accord with the present invention.

Referring to FIG. 5, a method of searching listings of a predetermined class of goods or services offered for sale online is initiated at step 505. A user-interface site (IP Aggregation Portal 14) is maintained and made accessible to a plurality of users 13 (step 510). Access to a predetermined set of third-party listings of a predetermined class of goods or services 12A, 12B, and 12C searchable online is maintained (step 515). Search criteria is then elicited from each user for searching each of the third-party sources 12A, 12B, and 12C (step 520). A search of each of the third-party sources 12A, 12B, and 12C is then performed in accord with the search criteria elicited from the user (step 525). A resulting set of goods or services is presented to the user in response to performing the search (step 530). The identification of those goods or services which are of interest to the user are then elicited from the user (step 535). The method terminates at step 540.

When an item is located that the user desires to bid on, the user submits to Aggregation Portal 14 the desired bid amount and Aggregation Portal 14 then submits the bid amount to each of sites 12A, 12B, and 12C that contain the desired item using the connection established to each of sites 12A, 12B, and 12C on behalf of the particular user. Aggregation Portal 14 then monitors the auction(s) of the item taking place on each of sites 12A, 12B and 12C by periodically searching sites 12A, 12B and 12C for the status of the auction(s), in a similar manner as described above. Aggregation Portal 14 then reports to the user whether the user was outbid for the item or whether the user has won or lost the auction for the item. Thus, Aggregation Portal 14 provides a single interface through which a user may locate an item, such as intellectual property, to bid and also engage in the bidding process.

For those goods or services listings (such as venture capital, for example) that require a fee or commission to be paid by the buyer, the Aggregation Portal 14 will submit the bid to such one of the sites 12A, 12B, and 12C that contain the desired listing, which charges the least amount in fees and commissions. Thus, Aggregation Portal 14 provides a single interface through which a user may locate a listing, such as venture capital, to bid and also engage in the bidding process in the most economical fashion.

Aggregation Portal 14 also enables a user to submit an item to be listed for auction on any of sites 12A, 12B and 12C. Initially, Aggregation Portal 14 receives from a user a listing for an item the user desires to offer for sale. The listing may include, by way of non-limiting example, an opening bid price, a reserve price, an auction expiration, a description and an illustrative graphic. Aggregation Portal then communication the item listing to each of sites 12A, 12B and 12C, or as designated by the user, via the connection established between Aggregation Portal 14 and sites 12A, 12B and 12C. Aggregation Portal 14 then monitors each of sites 12A, 12B and 12C to determine which of sites 12A, 12B and 12C has received the highest bid for the listed item. Immediately prior to the auction expiration time, Aggregation Portal 14 identifies the one of sites 12A, 12B and 12C that has received the highest bid and also cancels the auction for the listed item on the other of sites 12A, 12B and 12C. Thus, when the auction expires, the highest bidder across all of sites 12A, 12B and 12C wins the auction for the item.

In an exemplary embodiment, Aggregation Portal 14 monitors each of sites 12A, 12B and 12C to determine which of sites 12A, 12B and 12C has received the highest bid for the listed item and, upon identifying the highest bidder on one of sites each of sites 12A, 12B and 12C, posts the highest bidder and bid amount for the listed item on the other of sites each of sites 12A, 12B and 12C. Aggregation Portal 14 continuously monitors the bids received for the item on sites 12A, 12B and 12C to ensure that the bidding on each of sites 12A, 12B and 12C reflect the highest bid received on any of sites 12A, 12B and 12C. When the auction expires, the highest bid received across all of sites 12A, 12B and 12C wins the auction for the item. Accordingly, the item for sale may be listed simultaneously on multiple sites 12A, 12B and 12C and the one highest bidder across one of sites 12A, 12B and 12C wins the auction for the item. Because only the one highest bidder can win the auction for the item, this method is particularly suitable for posting for sale a unique item, such as intellectual property, simultaneously on multiple auction sites.

A method and system for facilitating a one-stop shopping aggregation portal site on the Internet, and a software application for searching, marketing and transacting goods and services, especially intellectual property, is described herein. These specific arrangements and methods described herein are merely illustrative of the principles of the present invention. Numerous modifications in form and detail may be made by those of ordinary skill in the art without departing from the spirit and scope of the present invention. Although this invention has been shown in relation to a particular embodiment, it should not be considered so limited. Rather, the present invention is limited only by the scope of the appended claims.

What is claimed is:

1. A method of searching intellectual property listings, comprising:
    maintaining a user-interface site accessible by a plurality of users;
    establishing a connection to a plurality of third-party sources of intellectual property listings available for transacting;
    receiving from at least one of said plurality of users search criteria for searching said plurality of third-party sources of intellectual property listings;
    searching said plurality of third-party sources of intellectual property listings according to said search criteria;
    presenting a resulting set of intellectual property listings to said at least one of said plurality of users;
    receiving from said at least one of said plurality of users an identification of those of said resulting set of intellectual property listings that are of interest to said at least one of said plurality of users;
    securing a permission from each of said plurality of third-party sources of intellectual property listings for allowing a search of each said plurality of third-party sources; and
    securing from each of said plurality of third-party sources of intellectual property listings a fee-sharing agreement.

2. A method of searching intellectual property listings, comprising:
    maintaining a user-interface site accessible by a plurality of users;
    establishing a connection to a plurality of third-party sources of intellectual property listings available for transacting;
    receiving from at least one of said plurality of users search criteria for searching said plurality of third-party sources of intellectual property listings;
    searching said plurality of third-party sources of intellectual property listings according to said search criteria;
    presenting a resulting set of intellectual property listings to said at least one of said plurality of users;
    receiving from said at least one of said plurality of users an identification of those of said resulting set of intellectual property listings that are of interest to said at least one of said plurality of users;
    designating a buffer memory for temporary storage of intellectual property listings matching said search criteria;
    reformatting said search criteria according to requirements of each of said plurality of third-party sources of intellectual property listings;
    searching through the intellectual property listings of said each of said plurality of third-party sources for matches with said respective reformatted search criteria;
    collecting such intellectual property listings that match said reformatted criteria and storing said listings in said buffer memory; and
    reordering said intellectual property listings stored in said buffer memory according to predefined criteria prior to presentation thereof to said at least one of said plurality of users.

* * * * *

UNITED STATES PATENT AND TRADEMARK OFFICE
CERTIFICATE OF CORRECTION

PATENT NO.      : 7,653,551 B2                                Page 1 of 1
APPLICATION NO. : 09/730232
DATED           : January 26, 2010
INVENTOR(S)     : Alexander I. Poltorak It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2726 days.

Signed and Sealed this

Twenty-third Day of November, 2010

David J. Kappos
*Director of the United States Patent and Trademark Office*